United States Patent
Watanabe et al.

(10) Patent No.: US 10,913,840 B2
(45) Date of Patent: Feb. 9, 2021

(54) RUBBER COMPOSITION AND TIRE

(71) Applicant: SUMITOMO RUBBER INDUSTRIES, LTD., Kobe (JP)

(72) Inventors: Kenya Watanabe, Kobe (JP); Takahiro Kawachi, Kobe (JP); Keiji Ikeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 80 days.

(21) Appl. No.: 15/921,149

(22) Filed: Mar. 14, 2018

(65) Prior Publication Data

US 2018/0282532 A1 Oct. 4, 2018

(30) Foreign Application Priority Data

Mar. 31, 2017 (JP) .................. 2017-071271

(51) Int. Cl.
*C08L 9/06* (2006.01)
*B60C 1/00* (2006.01)

(52) U.S. Cl.
CPC ............ *C08L 9/06* (2013.01); *B60C 1/00* (2013.01); *B60C 1/0016* (2013.01); *C08L 2205/02* (2013.01); *C08L 2205/035* (2013.01)

(58) Field of Classification Search
CPC ........ C08L 2205/02; C08L 91/00; C08L 9/06; C08L 2205/035
See application file for complete search history.

(56) References Cited

U.S. PATENT DOCUMENTS

| 4,775,505 | A  | * | 10/1988 | Kuroda ............... C04B 28/18 106/796 |
| 2007/0031661 | A1 | * | 2/2007 | Kanenari ............. B32B 7/10 428/355 BL |
| 2014/0155521 | A1 |   | 6/2014 | Miyazaki |
| 2015/0343843 | A1 | * | 12/2015 | Cato .................. B60C 1/0016 524/526 |
| 2017/0051135 | A1 | * | 2/2017 | Sandstrom ............ C08L 91/00 |
| 2018/0319955 | A1 | * | 11/2018 | Yukimura ........... C08K 5/3447 |

FOREIGN PATENT DOCUMENTS

| JP | 2013-53296 A | 3/2013 |
| WO | WO 2017/046766 | * 3/2017 |

* cited by examiner

*Primary Examiner* — Jeffrey C Mullis
(74) *Attorney, Agent, or Firm* — Birch, Stewart, Kolasch & Birch, LLP

(57) ABSTRACT

A rubber composition comprises 5 to 30 parts by mass of a terpene resin having a softening point of 100 to 120° C. and a molecular weight of 500 to 10,000, and 2 to 10 parts by mass of a liquid rubber or a liquid resin having a molecular weight of 100 to 3,500, based on 100 parts by mass of a rubber component comprising 72 to 95% by mass of an aromatic olefin rubber and 5 to 28% by mass of a diene olefin rubber, wherein a ratio of a content of the terpene resin to a content of the liquid rubber or the liquid resin (a content of the terpene resin/a content of the liquid rubber or the liquid resin) is from 0.5 to 5, and the tire is one having a tire member composed of the rubber composition.

8 Claims, No Drawings

RUBBER COMPOSITION AND TIRE

TECHNICAL FIELD

The present invention relates to a rubber composition and a tire having a tire member composed of the rubber composition.

BACKGROUND OF THE INVENTION

Important performances demanded for a tire are wet grip performance and abrasion resistance. Further, recently enhancement of fuel efficiency by improving a rolling resistance of a tire is demanded from the viewpoint of energy saving. For enhancing fuel efficiency, a low hysteresis loss is required, and for enhancing wet grip performance, a high wet skid resistance is required. However, a low hysteresis loss is contrary to a high wet skid resistance, and it is difficult to improve fuel efficiency and wet grip performance in good balance.

While a method of adding a carbon black to a rubber composition for improving abrasion resistance is known, a balance between fuel efficiency and wet grip performance tends to be lowered. Further, a butadiene rubber being advantageous for abrasion resistance gives a low hysteresis loss and good fuel efficiency, but is disadvantageous for wet grip performance.

Therefore, a method of improving wet grip performance, abrasion resistance and fuel efficiency in good balance is demanded. JP 2013-053296 A discloses a rubber composition for a tire in which fuel efficiency, abrasion resistance and wet grip performance are improved by compounding a specific liquid resin and silica, but there is still a room for improvement.

SUMMARY OF THE INVENTION

An object of the present invention is to provide a rubber composition being excellent in wet grip performance, abrasion resistance and fuel efficiency in good balance, and a tire having a tire member composed of the rubber composition.

The present invention relates to a rubber composition comprising 5 to 30 parts by mass of a terpene resin having a softening point of 100 to 120° C. and a molecular weight of 500 to 10,000, and 2 to 10 parts by mass of a liquid rubber or a liquid resin having a molecular weight of 100 to 3,500, based on 100 parts by mass of a rubber component comprising 72 to 95% by mass of an aromatic olefin rubber and 5 to 28% by mass of a diene olefin rubber, wherein a ratio of a content of the terpene resin to a content of the liquid rubber or the liquid resin (a content of the terpene resin/a content of the liquid rubber or the liquid resin) is from 0.5 to 5.

It is preferable that the liquid rubber or the liquid resin is a liquid rubber comprising hydrocarbon having 5 to 9 carbon atoms as a main component.

It is preferable that the aromatic olefin rubber is a styrene-butadiene rubber and the diene olefin rubber is a butadiene rubber.

The present invention relates to a tire having a tire member composed of the rubber composition.

The rubber composition of the present invention comprising 5 to 30 parts by mass of a terpene resin having a softening point of 100 to 120° C. and a molecular weight of 500 to 10,000, and 2 to 10 parts by mass of a liquid rubber or a liquid resin having a molecular weight of 100 to 3,500, based on 100 parts by mass of a rubber component comprising 72 to 95% by mass of an aromatic olefin rubber and 5 to 28% by mass of a diene olefin rubber, wherein a ratio of a content of the terpene resin to a content of the liquid rubber or the liquid resin (a content of the terpene resin/a content of the liquid rubber or the liquid resin) is from 0.5 to 5, and the tire having a tire member composed of the rubber composition are excellent in wet grip performance, abrasion resistance and fuel efficiency in good balance.

DETAILED DESCRIPTION

One embodiment of the present disclosure relates to the rubber composition comprising 5 to 30 parts by mass of a terpene resin having a softening point of 100 to 120° C. and a molecular weight of 500 to 10,000, and 2 to 10 parts by mass of a liquid rubber or a liquid resin having a molecular weight of 100 to 3,500, based on 100 parts by mass of a rubber component comprising 72 to 95% by mass of an aromatic olefin rubber and 5 to 28% by mass of a diene olefin rubber, wherein a ratio of a content of the terpene resin to a content of the liquid rubber or the liquid resin (a content of the terpene resin/a content of the liquid rubber or the liquid resin) is from 0.5 to 5. It is noted that herein the above-mentioned "a liquid rubber or a liquid resin" is also referred to simply as "a liquid rubber".

In the rubber composition according to the embodiment, it is considered that by compounding a specific terpene resin having a high compatibility with an aromatic olefin rubber and finely dispersing the terpene resin in the rubber composition, a high performance is exhibited under a stimulus response of a high frequency band such as a wet grip region, while a hysteresis loss is inhibited under a stimulus response of a low frequency band as in rolling of a tire. Further, it is considered that by finely dispersing the terpene resin in the rubber composition, lowering of abrasion resistance is inhibited. Furthermore, it is considered that by compounding the terpene resin and the liquid rubber simultaneously in good balance, the above-mentioned dispersion of the resin is controlled, lowering of fuel efficiency and abrasion resistance is inhibited and a high wet grip performance is exhibited, and therefore, abrasion resistance, wet grip performance and fuel efficiency are improved at a high level in good balance.

Examples of the aromatic olefin rubber include a styrene-butadiene rubber (SBR), a styrene-isoprene rubber (SIR), a styrene-isoprene-butadiene rubber (SIBR) and the like. Among these, SBR is preferable for the reason that an effect of the present disclosure can be exhibited more.

SBR is not limited particularly, and examples thereof include an un-modified solution-polymerized SBR (S-SBR), an un-modified emulsion-polymerized SBR (E-SBR), modified SBRs thereof (modified S-SBR, modified E-SBR) and the like. Examples of modified SBR include a terminal-modified SBR and/or a main chain-modified SBR, a modified SBR subjected to coupling with tin, a silicon compound or the like (condensate, one having a branch structure) and the like.

A content of the aromatic olefin rubber in the rubber component is not less than 72% by mass, preferably not less than 75% by mass, more preferably not less than 78% by mass. When the content of the aromatic olefin rubber is less than 72% by mass, wet grip performance tends to be lowered. On the other hand, the content of the aromatic olefin rubber is not more than 95% by mass, preferably not more than 90% by mass, more preferably not more than 85% by mass. When the content of the aromatic olefin rubber exceeds 95% by mass, abrasion resistance and fuel efficiency tend to be lowered.

Examples of the diene olefin rubber include isoprene rubbers including a natural rubber (NR) and an isoprene rubber (IR), a butadiene rubber (BR), an ethylene-propylene-diene rubber (EPDM), a chloroprene rubber (CR), an acrylonitrile-butadiene rubber (NBR), a butyl rubber (IIR) and the like. Among these, BR is preferable for the reason that abrasion resistance is excellent.

Various BRs can be used as the BR such as, a high cis-1,4-polybutadiene rubber (high-cis BR), a butadiene rubber comprising 1,2-syndiotactic polybutadiene crystals (SPB-containing BR), and a modified butadiene rubber (modified BR).

The high-cis BR is a butadiene rubber in which the content of cis-1,4 bond is not less than 90% by mass. Examples of such high-cis BR include BR1220 manufactured by ZEON CORPORATION, BR130B, BR150B and BR150L manufactured by Ube Industries, Ltd. and the like. Low-temperature property and abrasion resistance can be improved by compounding a high-cis BR.

An example of the SPB-containing BR is not one in which 1,2-syndiotactic polybutadiene crystals are simply dispersed in the BR, but one in which 1,2-syndiotactic polybutadiene crystals are chemically bonded with the BR and dispersed therein. Examples of such SPB-containing BR include VCR-303, VCR-412 and VCR-617 manufactured by Ube Industries, Ltd. and the like.

Examples of the modified BR include a modified BR (tin modified BR) obtained by performing polymerization of 1,3-butadiene with a lithium initiator and then adding a tin compound, and further having the molecular terminals bonded with a tin-carbon bond, a butadiene rubber (modified BR for silica) having an alkoxysilane condensate compound in an active terminal thereof and the like. Examples of such modified BRs include BR1250H (tin-modified) manufactured by ZEON CORPORATION, S-modified polymer (modified for silica) manufactured by Sumitomo Chemical Industry Company Limited and the like.

A content of the diene olefin rubber in the rubber component is not less than 5% by mass, preferably not less than 10% by mass, more preferably not less than 15% by mass. When the content of the diene olefin rubber is less than 5% by mass, abrasion resistance tends to be lowered. On the other hand, the content of the diene olefin rubber is not more than 28% by mass, preferably not more than 25% by mass, more preferably not more than 22% by mass. When the content of the diene olefin rubber exceeds 28% by mass, wet grip performance tends to be lowered.

Examples of the terpene resin include polyterpene resins comprising at least one selected from starting materials of terpene such as $\alpha$-pinene, $\beta$-pinene, limonene and dipentene; an aromatic modified terpene resin prepared using a terpene compound and an aromatic compound as starting materials; terpene resins (terpene resins not hydrogenated) such as a terpene-phenol resin prepared using a terpene compound and a phenol compound as starting materials; and terpene resins obtained by subjecting these terpene resins to hydrogenation (hydrogenated terpene resins). Here, examples of the aromatic compound to be used as a starting material for the aromatic modified terpene resin include styrene, $\alpha$-methylstyrene, vinyl toluene, divinyl toluene and the like. Further, examples of the phenol compound to be used as a starting material for the terpene-phenol resin include phenol, bisphenol A, cresol, xylenol and the like.

A softening point of the terpene resin is not lower than 100° C., preferably not lower than 105° C. When the softening point is lower than 100° C., there is a tendency that sufficient grip performance cannot be obtained. On the other hand, the softening point of the terpene resin is not higher than 120° C., preferably not higher than 115° C. When the softening point exceeds 120° C., fuel efficiency tends to be lowered and there is a tendency that generation of an un-dissolved resin occurs during a kneading step, which causes insufficient dispersion and deterioration of abrasion resistance.

A molecular weight of the terpene resin is not less than 500, preferably not less than 600. When the molecular weight is less than 500, abrasion resistance tends to be lowered. On the other hand, the molecular weight is not more than 10,000, preferably not more than 8,000. When the molecular weight exceeds 10,000, there is a tendency that processability during a kneading step is deteriorated. It is noted that herein the molecular weight of the terpene resin is a weight-average molecular weight (Mw) and is a value calibrated with polystyrene standards based on measurement values determined with a gel permeation chromatography (GPC) (GPC-8000 series manufactured by Tosoh Corporation; detector: differential refractometer).

A content of the terpene resin is not less than 5 parts by mass, preferably not less than 7 parts by mass, more preferably not less than 9 parts by mass based on 100 parts by mass of the rubber component. When the content of the terpene resin is less than 5 parts by mass, there is a tendency that a sufficient wet grip performance cannot be obtained. On the other hand, the content of the terpene resin is not more than 30 parts by mass, preferably not more than 25 parts by mass, more preferably not more than 20 parts by mass. When the content of the terpene resin exceeds 30 parts by mass, fuel efficiency tends to be lowered and there is a tendency that generation of an un-dissolved resin occurs during a kneading step, which causes inferior dispersion and deterioration of abrasion resistance.

Examples of the liquid rubber include a liquid butadiene rubber (liquid BR), a liquid styrene-butadiene rubber (liquid SBR), a liquid isoprene rubber (liquid IR) and the like. Examples of the liquid resin include a liquid terpene resin, a liquid C5-C9 resin and the like. These liquid rubber (including the liquid resin) may be used alone or may be used in combination of two or more thereof. Among these, the liquid SBR or the liquid C5-C9 resin is preferable. RICON (registered trade mark) series resins manufactured by CRAY VALLEYS can be used suitably as the liquid resin and the liquid rubber.

A molecular weight of the liquid rubber is not less than 100, preferably not less than 200. When the molecular weight is less than 100, abrasion resistance tends to be lowered. On the other hand, the molecular weight of the liquid rubber is not more than 3,500, preferably not more than 2,500. When the molecular weight exceeds 3,500, there is a tendency that processability during a kneading step is deteriorated. It is noted that herein the molecular weight of the liquid rubber is a weight-average molecular weight (Mw) and is a value calibrated with polystyrene standards based on measurement values determined with a gel permeation chromatograph (GPC) (GPC-8000 series manufactured by Tosoh Corporation; detector: differential refractometer).

A content of the liquid rubber is not less than 2 parts by mass, preferably not less than 3 parts by mass, more preferably not less than 4 parts by mass based on 100 parts by mass of the rubber component. When the content of the liquid rubber is less than 2 parts by mass, there is a tendency that a sufficient wet grip performance cannot be obtained. On the other hand, the content of the liquid rubber is not more than 10 parts by mass, preferably not more than 9 parts by mass, more preferably not more than 8 parts by mass. When the content of the liquid rubber exceeds 10 parts by mass, abrasion resistance tends to be lowered.

A ratio of a content of the terpene resin to a content of the liquid rubber (a content of the terpene resin/a content of the liquid rubber) is not less than 0.5, more preferably not less than 0.7. When the ratio of a content of the terpene resin to a content of the liquid rubber is less than 0.5, there is a tendency that a sufficient grip performance cannot be obtained. On the other hand, the ratio of a content of the terpene resin to a content of the liquid rubber is not more than 5, more preferably not more than 4. When the ratio of a content of the terpene resin to a content of the liquid rubber exceeds 5, fuel efficiency and abrasion resistance tend to be deteriorated.

In addition to the above-mentioned rubber components, the terpene resin and the liquid rubber, the rubber composition of the present embodiment can optionally comprise compounding agents and additives having been used in a tire industry, for example, reinforcing fillers such as carbon black, silica, calcium carbonate, alumina, clay and talc, a coupling agent, zinc oxide, a softening agent other than the above-mentioned terpene resins and liquid rubbers, wax, various antioxidants, stearic acid, a vulcanizing agent such as sulfur, various vulcanization accelerators and the like according to necessity.

Reinforcing fillers which have been usually used in the tire industry can be optionally selected and used, and mainly carbon black and silica are preferable.

Examples of the carbon black include furnace black, acetylene black, thermal black, channel black, graphite and the like and these carbon blacks may be used alone or may be used in combination with two or more thereof. Among them, furnace black is preferable since low-temperature property and abrasion resistance can be improved in good balance.

A nitrogen adsorption specific surface area ($N_2SA$) of the carbon black is preferably not less than 70 $m^2/g$, more preferably not less than 90 $m^2/g$, from the viewpoint that sufficient reinforceability and abrasion resistance can be obtained. Further, from the viewpoint that dispersibility is excellent and heat generation is hard to arise, the $N_2SA$ of the carbon black is preferably not more than 300 $m^2/g$, more preferably not more than 250 $m^2/g$. It is noted that herein the $N_2SA$ of the carbon black is a value measured in accordance with JIS K6217-2 "Carbon black for rubber industry—Fundamental characteristics—Part 2: Determination of specific surface area—Nitrogen adsorption methods—Single-point procedures".

When the rubber composition comprises carbon black, a content of the carbon black is preferably not less than 5 parts by mass, more preferably not less than 10 parts by mass based on 100 parts by mass of the rubber component. When content of the carbon black is less than 5 parts by mass, there is a tendency that sufficient reinforceability cannot be obtained. On the other hand, the content of the carbon black is preferably not more than 200 parts by mass, more preferably not more than 150 parts by mass, further preferably not more than 60 parts by mass. When the content of the carbon black exceeds 200 parts by mass, there is a tendency that processability is deteriorated, heat generation is apt to arise and abrasion resistance is lowered.

The silica is not limited particularly, and examples thereof include silica prepared by a dry method (anhydrous silica), silica prepared by a wet method (hydrous silica) and the like. For the reason that the number of silanol groups is large, silica prepared by a wet method is preferable.

A nitrogen adsorption specific surface area ($N_2SA$) of the silica is preferably not less than 80 $m^2/g$, more preferably not less than 100 $m^2/g$, from the viewpoint of wet grip performance. On the other hand, from the viewpoint of fuel efficiency and processability, the $N_2SA$ of the silica is preferably not more than 250 $m^2/g$, more preferably not more than 220 $m^2/g$. It is noted that herein, the $N_2SA$ of the silica is a value measured in accordance with ASTM D3037-93.

When the rubber composition comprises the silica, a content thereof is preferably not less than 5 parts by mass, more preferably not less than 10 parts by mass, based on 100 parts by mass of the rubber component, from the viewpoint of wet grip performance. On the other hand, the content of the silica is preferably not more than 200 parts by mass, more preferably not more than 150 parts by mass from the viewpoint of improving dispersibility at the time of kneading and inhibiting lowering of processability due to re-agglomeration of silica after heating for rolling and during the storage thereof after the rolling.

When the rubber composition comprises the silica, it is preferable that the silica is used in combination with a silane coupling agent. Any silane coupling agent which has been used in combination with silica in the rubber industry can be used as the silane coupling agent, and examples thereof include sulfide silane coupling agents such as Si75, Si266 (bis(3-triethoxysilylpropyl)disulfide) manufactured by Evonik Degussa and Si69 (bis(3-triethoxysilylpropyl)tetrasulfide) manufactured by Evonik Degussa; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof. Among them, sulfide silane coupling agents and mercapto silane coupling agents are preferable from the viewpoint of their strong binding force with silica and excellent heat build-up characteristic.

When the rubber composition comprises the silane coupling agent, the content of the silane coupling agent is preferably not less than 2 parts by mass, more preferably not less than 3 parts by mass based on 100 parts by mass of the silica. When the content of the silane coupling agent is less than 2 parts by mass, there is a tendency that an effect of improving dispersion of the silica is not obtained sufficiently. On the other hand, the content of the silane coupling agent is preferably not more than 25 parts by mass, more preferably not more than 20 parts by mass. When the content of the silane coupling agent exceeds 25 parts by mass, an effect for a cost tends not to be obtained.

Softening agents other than the terpene resin and the liquid rubber are not limited particularly as far as they have been used generally in the field of rubber industry, and there are, for example, liquid polymers other than the terpene resin and the liquid rubber, oils comprising mineral oil such as aromatic oil, process oil and paraffin oil and the like, and the softening agent can be properly selected therefrom.

When the rubber composition comprises the oil, the content thereof is preferably not more than 100 parts by mass, more preferably not more than 80 parts by mass based on 100 parts by mass of the rubber component from the viewpoint of preventing lowering of abrasion resistance. On the other hand, the content thereof is preferably not less than 20 parts by mass, from the viewpoint of processability.

When the rubber composition comprises the wax, the content thereof is preferably not less than 1 part by mass, more preferably not less than 2 parts by mass based on 100 parts by mass of the rubber component from the viewpoint of inhibiting deterioration of a rubber. On the other hand, the content thereof is preferably not more than 10 parts by mass, more preferably not more than 5 parts by mass, from the viewpoint of preventing whitening of a tire due to blooming of the wax on the surface of a tire.

When the rubber composition comprises the antioxidant, the content thereof is preferably not less than 1 part by mass, more preferably not less than 2 parts by mass based on 100 parts by mass of the rubber component from the viewpoint of inhibiting deterioration of a rubber. On the other hand, the content thereof is preferably not more than 10 parts by mass, more preferably not more than 5 parts by mass, from the viewpoint of preventing whitening of a tire due to blooming of the antioxidant on the surface of a tire.

When the rubber composition comprises the stearic acid, the content thereof is preferably not less than 0.5 part by mass, more preferably not less than 1 part by mass based on 100 parts by mass of the rubber component from the viewpoint of increasing a vulcanization rate and increasing productivity of a tire. On the other hand, the content thereof is preferably not more than 8 parts by mass, more preferably not more than 5 parts by mass, from the viewpoint of preventing deterioration of abrasion resistance.

When the rubber composition comprises the zinc oxide, the content thereof is preferably not less than 0.5 part by mass, more preferably not less than 1 part by mass based on 100 parts by mass of the rubber component from the viewpoint of increasing a vulcanization rate and increasing productivity of a tire. On the other hand, the content thereof is preferably not more than 8 parts by mass, more preferably not more than 5 parts by mass, from the viewpoint of preventing deterioration of abrasion resistance.

When the rubber composition comprises the sulfur as a vulcanizing agent, the content thereof is preferably not less than 0.5 part by mass, based on 100 parts by mass of the rubber component from the viewpoint of securing a sufficient vulcanization reaction and obtaining good grip performance and abrasion resistance. On the other hand, the content thereof is preferably not more than 3 parts by mass, from the viewpoint of inhibiting lowering of grip performance and abrasion resistance due to blooming.

Examples of the vulcanization accelerator include sulfenamide-, thiazole-, thiuram-, thiourea-, guanidine-, dithiocarbamate-, aldehyde amine- or aldehyde ammonia-, imidazoline- and xanthate-based vulcanization accelerators. These vulcanization accelerators may be used alone or may be used in combination of two or more thereof. Among these, sulfenamide-based vulcanization accelerators are preferred from the viewpoint of excellent vulcanization characteristics and excellent fuel efficiency and excellent fuel efficiency due to rubber properties after vulcanization. Examples of sulfenamide-based vulcanization accelerators include N-t-butyl-2-benzothiazolylsulfenamide (TBBS), N-cyclohexyl-2-benzothiazolylsulfenamide (CZ), N,N'-dicyclohexyl-2-benzothiazolylsulfenamide (DZ) and the like.

When the rubber composition comprises the vulcanization accelerator, a content thereof is preferably not less than 0.1 part by mass, more preferably not less than 0.5 part by mass based on 100 parts by mass of the rubber component. When the content thereof is less than 0.1 part by mass, the rubber composition may not be vulcanized sufficiently and required rubber properties may not be obtained. On the other hand, the content of the vulcanization accelerator is preferably not more than 5 parts by mass, more preferably not more than 3 parts by mass. When the content thereof exceeds 5 parts by mass, it may cause rubber burning.

The rubber composition according to the embodiment can be prepared by a known method. The rubber composition can be prepared, for example, by a method of kneading the above-mentioned components with a rubber kneading machine such as an open roll, a Banbury mixer or an enclosed kneader and then subjecting the kneaded product to vulcanization, or by other method.

An another embodiment of the present embodiment provides a tire having a tire member composed of the above-mentioned rubber composition. Examples of the tire member composed of the above-mentioned rubber composition include a tread, an under tread, a carcass, a side wall, a bead and the like. Among them, a tread is preferable from the viewpoint of excellent wet grip performance, abrasion resistance and fuel efficiency.

The tire according to the another embodiment of the present embodiment can be produced by a usual method using the above-mentioned rubber composition. Namely, the tire can be produced by subjecting an un-vulcanized rubber composition prepared by kneading the above-mentioned components to extrusion processing to a shape of a tire member such as a tread or the like, and then laminating together with other tire members on a tire building machine and forming by a usual forming method, thus forming an unvulcanized tire, and heating and compressing this unvulcanized tire in a vulcanizer.

In the above, one embodiment of the present disclosure is described. The present disclosure is not particularly limited to the above embodiment. It should be noted that the above embodiment mainly describes a disclosure having the following constitutions.

(1) A rubber composition comprising:
5 to 30 parts by mass, preferably 7 to 25 parts by mass, more preferably 9 to 20 parts by mass of a terpene resin having a softening point of 100 to 120° C., preferably 105 to 115° C. and a molecular weight of 500 to 10,000, preferably 600 to 8,000, and
2 to 10 parts by mass, preferably 3 to 9 parts by mass, more preferably 4 to 8 parts by mass of a liquid rubber or a liquid resin having a molecular weight of 100 to 3,500, preferably 200 to 2,500,
based on 100 parts by mass of a rubber component comprising 72 to 95% by mass, preferably 75 to 90 parts by mass, more preferably 78 to 85 parts by mass of an aromatic olefin rubber and 5 to 28% by mass, preferably 10 to 25 parts by mass, more preferably 15 to 22 parts by mass of a diene olefin rubber,
wherein a ratio of a content of the terpene resin to a content of the liquid rubber or the liquid resin (a content of the terpene resin/a content of the liquid rubber or the liquid resin) is from 0.5 to 5, preferably 0.7 to 4.

(2) The rubber composition of (1), wherein the liquid rubber or the liquid resin is a liquid rubber comprising hydrocarbon having 5 to 9 carbon atoms as a main component.

(3) The rubber composition of (1) or (2), wherein the aromatic olefin rubber is a styrene-butadiene rubber and the diene olefin rubber is a butadiene rubber.

(4) A tire having a tire member composed of the rubber composition of any one of (1) to (3).

EXAMPLE

The present disclosure is described based on Examples, but the present disclosure is not limited thereto only.

A variety of chemicals used in Examples and Comparative Examples are explained below.
SBR: SLR6430 (S-SBR) manufactured by TRINSEO S.A.
BR: BR150L (high-cis BR) manufactured by Ube Industries, Ltd.
Terpene resin 1: SYLVATRAXX 4150 (softening point: 118° C., weight-average molecular weight: 2,500, not hydrogenated) manufactured by Arizona Chemical
Terpene resin 2: TO125 (softening point: 125° C., weight-average molecular weight: 800, not hydrogenated) manufactured by Yasuhara Chemical Co., Ltd.
Liquid rubber 1: RICON340 (Liquid C5-C9 resin, weight-average molecular weight: 2,400) manufactured by CRAY VALLEY
Liquid rubber 2: RICON100 (Liquid SBR, weight-average molecular weight: 4,500) manufactured by CRAY VALLEY
Carbon black: SHOBLACK N220 (nitrogen adsorption specific surface area ($N_2SA$): 125 $m^2/g$) manufactured by Cabot Japan K.K.
Silica: ULTRASIL VN3 (nitrogen adsorption specific surface area ($N_2SA$): 175 $m^2/g$) manufactured by Evonik Degussa
Silane coupling agent: Si69 (bis(3-triethoxysilylpropyl)tetrasulfide) manufactured by Evonik Degussa
Antioxidant: Nocrac 6C (N-(1,3-dimethylbutyl)-N'-phenyl-p-phenylenediamine) manufactured by OUCHI SHINKO CHEMICAL INDUSTRIAL CO., LTD.
Stearic acid: Stearic acid manufactured by NOF Corporation
Oil: Mineral Oil PW-380 manufactured by Idemitsu Kosan Co., Ltd.
Zinc oxide: Zinc Oxide No. 1 manufactured by Mitsui Mining & Smelting Co., Ltd.
Wax: SUNNOC Wax N manufactured by OUCHI SHINKO CHEMICAL INDUSTRIAL CO., LTD.
Sulfur: Powdered sulfur manufactured by Tsurumi Chemical Industry Co., Ltd.
Vulcanization accelerator Nocceler CZ (N-cyclohexyl-2-benzothiazolylsulfeneamide) manufactured by OUCHI SHINKO CHEMICAL INDUSTRIAL CO., LTD.
Vulcanization accelerator 2: Nocceler D (N,N'-diphenyl guanidine) manufactured by OUCHI SHINKO CHEMICAL INDUSTRIAL CO., LTD.

EXAMPLES AND COMPARATIVE EXAMPLES

Compounding components except sulfur and a vulcanization accelerator were poured into a 1.7-liter Banbury mixer available from Kobe Steel, Ltd. according to the compounding formulations shown in Tables 1 and 2 to give a filling percentage of 58%, followed by 3-minute kneading at 80 rpm until a temperature reached 140° C. Subsequently after adding sulfur and a vulcanization accelerator to an obtained kneaded product, the mixture was subjected to kneading at 80° C. for five minutes using an open roll to obtain an unvulcanized rubber composition of each of Examples and Comparative Examples. Further, the obtained unvulcanized rubber composition was subjected to press-vulcanization at 170° C. for 12 minutes to produce a test rubber composition.

The following evaluations were made using the obtained unvulcanized rubber compositions and test rubber compositions. The results of the evaluations are shown in Tables 1 and 2.

Mooney Viscosity Index

A Mooney viscosity ($ML_{1+4}$) of each of the unvulcanized rubber compositions was determined under the temperature condition of 130° C. according to JIS K 6300-1 "Unvulcanized rubber—Physical properties—Part. 1: Method for measuring viscosity and scorch time using a Mooney viscometer". The result is shown by an index obtained from the following equation, assuming a Mooney viscosity index of Comparative Example 1 to be 100. As the index is larger, the Mooney viscosity is lower and processability is more excellent.

(Mooney viscosity index)=($ML_{1+4}$ of Comparative Example 1)/($ML_{1+4}$ of each formulation)×100

Index of Fuel Efficiency

A loss tangent (tan δ) of each test rubber composition was measured at a dynamic strain amplitude of 1%, a frequency of 10 Hz and a temperature of 50° C. using a spectrometer manufactured by Ueshima Seisakusho Co., Ltd. The results of measurement are indicated with an index obtained by the following equation. The larger the index is, the smaller a rolling resistance is and the more excellent the fuel efficiency is. A performance target value is 80 or more.

(Index of fuel efficiency)=(tan δ of Comparative Example 1)/(tan δ of each formulation)×100

Index of Wet Grip Performance

A wet grip performance of each test rubber composition was evaluated using a flat belt friction tester (FR 5010 type) manufactured by Ueshima Seisakusho Co., Ltd. A cylindrical rubber test piece of each test rubber composition of 20 mm wide×100 mm diameter was used as a sample, and a slip rate of the sample on a road surface was changed from 0% to 70% under conditions of a speed of 20 km/hour, a load of 4 kgf and a road surface temperature of 20° C., and a maximum friction coefficient detected was read. The results of measurement are indicated with an index obtained by the following equation. The larger the index is, the more excellent the wet grip performance is. A performance target value is 120 or more.

(Index of wet grip performance)=(Maximum value of friction coefficient of each formulation)/(Maximum value of friction coefficient of Comparative Example 1)×100

Abrasion Resistance Index

An abrasion loss of each test rubber composition was measured with a Lambourn abrasion testing machine under the conditions of a room temperature, a load of 1.0 kgf, and a slip rate of 30%. Reciprocals of the obtained abrasion losses were calculated, and are expressed as indices, assuming a reciprocal of an abrasion loss of Comparative Example 1 to be 100. As an index is larger, abrasion resistance is excellent. A performance target value is 80 or more.

(Abrasion resistance index)=(Reciprocal of an abrasion loss of each formulation)/(Reciprocal of an abrasion loss of Comparative Example 1)×100

TABLE 1

|  | Examples | | | Comparative Examples | | | | | | | | |
| --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 |
| Compounding amount (part by mass) | | | | | | | | | | | | |
| SBR | 80 | 80 | 90 | 80 | 80 | 80 | 80 | 80 | 80 | 80 | 50 | 80 |
| BR | 20 | 20 | 10 | 20 | 20 | 20 | 20 | 20 | 20 | 20 | 50 | 20 |
| Terpene resin 1 | 10 | 20 | 10 | — | 20 | — | 50 | 10 | 1 | 10 | 10 | 10 |
| Terpene resin 2 | — | — | — | — | — | — | — | — | — | — | — | — |
| Liquid rubber 1 | 10 | 10 | 10 | — | — | 20 | 10 | 50 | 10 | 1 | 10 | 20 |
| Liquid rubber 2 | — | — | — | — | — | — | — | — | — | — | — | — |
| Silica | 75 | 75 | 75 | 75 | 75 | 75 | 75 | 75 | 75 | 75 | 75 | 75 |
| Silane coupling agent | 6 | 6 | 6 | 6 | 6 | 6 | 6 | 6 | 6 | 6 | 6 | 6 |
| Carbon black | 5 | 5 | 5 | 5 | 5 | 5 | 5 | 5 | 5 | 5 | 5 | 5 |
| Oil | 20 | 20 | 20 | 20 | 20 | 20 | 20 | 20 | 20 | 20 | 20 | 20 |
| Antioxidant | 1.5 | 1.5 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 | 2 | 2 |
| Zinc oxide | 2.5 | 2.5 | 2.5 | 2.5 | 2.5 | 2.5 | 2.5 | 2.5 | 2.5 | 2.5 | 2.5 | 2.5 |
| Wax | 1 | 1 | 1 | 1 | 1 | 1 | 1 | 1 | 1 | 1 | 1 | 1 |
| Sulfur | 2 | 2 | 2 | 2 | 2 | 2 | 2 | 2 | 2 | 2 | 2 | 2 |
| Vulcanization accelerator 1 | 1.8 | 1.8 | 1.8 | 1.8 | 1.8 | 1.8 | 1.8 | 1.8 | 1.8 | 1.8 | 1.8 | 1.8 |
| Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | | | | | | | | | | | | |
| Mooney viscosity index | 119 | 135 | 117 | 100 | 112 | 124 | 131 | 147 | 114 | 105 | 149 | 142 |
| Index of fuel efficiency | 99 | 84 | 93 | 100 | 88 | 96 | 67 | 87 | 98 | 96 | 140 | 91 |
| Index of wet grip performance | 121 | 132 | 139 | 100 | 115 | 110 | 149 | 133 | 104 | 107 | 61 | 124 |
| Abrasion resistance index | 98 | 94 | 80 | 100 | 95 | 89 | 67 | 59 | 94 | 97 | 118 | 93 |

TABLE 2

|  | Comparative Examples | | | |
| --- | --- | --- | --- | --- |
|  | 10 | 11 | 12 | 13 |
| Compounding amount (part by mass) | | | | |
| SBR | 100 | 80 | 80 | 80 |
| BR | — | 20 | 20 | 20 |
| Terpene resin 1 | 10 | 10 | — | — |
| Terpene resin 2 | — | — | 10 | 10 |
| Liquid rubber 1 | 10 | — | 10 | — |
| Liquid rubber 2 | — | 10 | — | 10 |
| Silica | 75 | 75 | 75 | 75 |
| Silane coupling agent | 6 | 6 | 6 | 6 |
| Carbon black | 5 | 5 | 5 | 5 |
| Oil | 20 | 20 | 20 | 20 |
| Antioxidant | 1.5 | 1.5 | 1.5 | 1.5 |
| Stearic acid | 2 | 2 | 2 | 2 |
| Zinc oxide | 2.5 | 2.5 | 2.5 | 2.5 |
| Wax | 1 | 1 | 1 | 1 |
| Sulfur | 2 | 2 | 2 | 2 |
| Vulcanization accelerator 1 | 1.8 | 1.8 | 1.8 | 1.8 |
| Vulcanization accelerator 2 | 1.2 | 1.2 | 1.2 | 1.2 |
| Evaluation | | | | |
| Mooney viscosity index | 115 | 104 | 111 | 101 |
| Index of fuel efficiency index | 86 | 95 | 88 | 80 |
| Index of wet grip performance | 140 | 126 | 129 | 133 |
| Abrasion resistance index | 75 | 90 | 90 | 81 |

From the results shown in Tables 1 and 2, it is seen that the rubber composition of the present disclosure is excellent in wet grip performance, abrasion resistance and fuel efficiency in good balance.

The invention claimed is:

1. A rubber composition comprising:
   5 to 30 parts by mass of a terpene resin having a softening point of 100 to 120° C. and a molecular weight of 500 to 10,000,
   2 to 10 parts by mass of a liquid rubber having a molecular weight of 100 to 3,500,
   a silane coupling agent, and
   reinforcing fillers,
   based on 100 parts by mass of a rubber component comprising 72 to 95% by mass of an aromatic olefin rubber and 5 to 28% by mass of a diene olefin rubber,
   wherein a ratio of a content of the terpene resin to a content of the liquid rubber (a content of the terpene resin/a content of the liquid rubber) is from 1 to 5,
   wherein the liquid rubber comprises hydrocarbon having 5 to 9 carbon atoms as a main component,
   wherein a total amount of the liquid rubber and the terpene resin is not less than 20% by mass based on 100 parts by mass of the rubber component,
   wherein the silane coupling agent comprises a mercapto silane coupling agent, and
   wherein the reinforcing fillers comprise silica,
      wherein a nitrogen adsorption specific surface area ($N_2SA$) of the silica is from 100 to 220 $m^2/g$, and
      wherein a content of the silica is from 10 to 150 parts by mass based on 100 parts by mass of the rubber component.

2. The rubber composition of claim 1, wherein the aromatic olefin rubber is a styrene-butadiene rubber and the diene olefin rubber is a butadiene rubber.

3. The rubber composition of claim 1, wherein the content of the terpene resin is larger than the content of the liquid rubber.

4. The rubber composition of claim 1, wherein the reinforcing fillers comprise carbon black, and
   wherein a nitrogen adsorption specific surface area ($N_2SA$) of the carbon black is from 90 to 250 $m^2/g$.

5. The rubber composition of claim 4, wherein a content of the carbon black is from 10 to 60 parts by mass based on 100 parts by mass of the rubber component.

6. The rubber composition of claim 1, wherein the rubber component comprises 78 to 85% by mass of the aromatic olefin rubber.

7. The rubber composition of claim 1, wherein the rubber component comprises 15 to 22% by mass of the diene olefin rubber.

8. The rubber composition of claim 1, wherein the softening point of the terpene resin is 105 to 115° C.

* * * * *